(No Model.)

T. B. HOWE.
JAR FASTENER.

No. 370,394. Patented Sept. 27, 1887.

Witnesses.
Chas. R. Burr.
A. J. Stewart.

Inventor.
Thomas B. Howe
by Church & Church
his Attorneys.

UNITED STATES PATENT OFFICE.

THOMAS B. HOWE, OF SCRANTON, PENNSYLVANIA, ASSIGNOR OF TWO-THIRDS TO G. A. CLEARWATER AND M. A. GOODWIN, BOTH OF SAME PLACE.

JAR-FASTENER.

SPECIFICATION forming part of Letters Patent No. 370,394, dated September 27, 1887.

Application filed June 29, 1887. Serial No. 242,890. (No model.)

To all whom it may concern:

Be it known that I, THOMAS B. HOWE, of Scranton, in the county of Lackawanna and State of Pennsylvania, have invented certain new and useful Improvements in Jar-Fasteners; and I do hereby declare the following to be a full, clear, and exact description of the same, reference being had to the accompanying drawings, forming a part of this specification, and to the figures and letters of reference marked thereon.

My invention has for its object to improve that class of fasteners used more particularly for fastening the covers on wide-mouth or what are popularly known as "fruit-jars," although it may, with slight modifications, be used on other styles of jars, or on bottles; and to this end the said invention consists in certain combinations and arrangements of parts and details of construction, to be hereinafter described, and pointed out particularly in the claims at the end of this specification.

Figure 1:
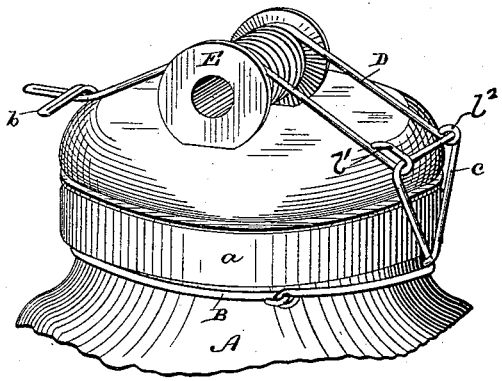
Figure 2:
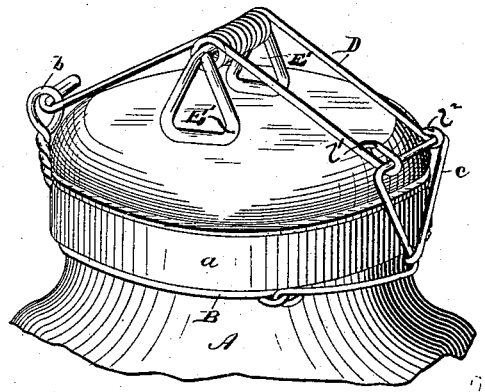
Figure 3:
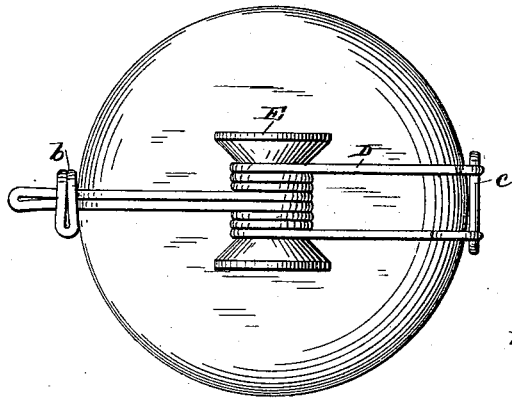
Figure 4:
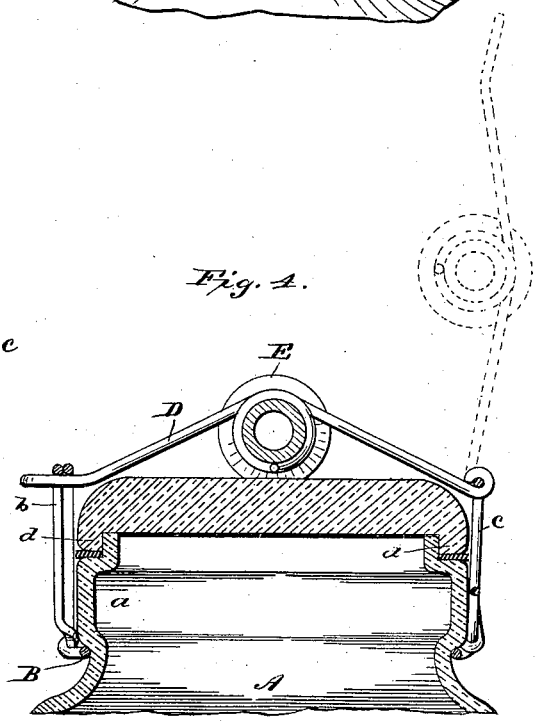

In the accompanying drawings, Figure 1 is a perspective view of a jar constructed in accordance with my invention. Fig. 2 is a perspective view of a modification. Fig. 3 is a top plan view. Fig. 4 is a section on the line $x\ x$, Fig. 1.

The glass body of the jar A has a collar or ring, $a$, projecting slightly outward, located at a point just below its mouth, beneath which passes the wire B, portions of which are formed into the catch $b$ and ear $c$. It will be seen that this wire is one continuous piece, doubled, twisted, and bent into the proper shape for the catch at the front, and looped and twisted at the rear to form the ear, the two ends being preferably united at the side. There being little or no liability of breaking the cover with my fastener, I prefer to form the same of glass similar to the body of the jar, and with a narrow rim, $d$, which fits down over the mouth of the jar and seats on the rubber ring on the collar $a$.

A spring-wire, D, hinging on the ear $c$, passes over the top of the cover and under the catch $b$ for the purpose of holding the top securely in position. This spring-wire is formed into a coiled spring at the center, through which passes what I term an "independent"—i. e., separate—"bridge-piece," E, that holds said spring away from the cover and rests thereon itself, distributing the pressure exerted by the spring on either side.

The bridge-piece may be of wood or metal, as desired. In Fig. 1 it is wood, and of a shape somewhat similar to an ordinary spool, the sides of which resting on the jar-cover being preferably cut away to afford a broad bearing-surface, and the enlargements or collars at the ends of the spool serving to maintain the spring in proper position. In Fig. 2 the bridge-piece is formed of a single piece of wire passing through the spring, with its ends bent into loops E', extending downward, and having their lower portions flattened where they bear upon the cover.

If reference be had now to Fig. 1, it will be seen that one of the loops, $e'$, of the wire D passing around the ear $c$ is longer than the other loop, $e^2$, so as to allow the bridge and spring to hinge on the loop $e^2$, and swing a limited distance sidewise, or just far enough to be released from the catch $b$ at the forward end, the said catch in this instance being in the form of a hook.

I preferably construct the spring or latch passing over the cover of a single piece of wire doubled in the center and left substantially straight and in contact with each other up to where the bridge is located, at which point the two ends are formed into a spiral spring, the ends of the wire circling outward in opposite directions and then passing back to the bail in lines substantially parallel. This forms practically two independent springs, which uniting at the center of the coiled portion form the forwardly-extending handle for engaging the catch, while at the rear the hinges are widely separated, materially aiding in equalizing the pressure over the whole top.

It will be observed that the spring or latch passing over the top of the jar when swung open may be employed as a handle for lifting and handling the jar, the bridge and coiled spring serving as a thumb-piece, as will be readily understood. This construction renders the fastener particularly desirable where it has to be heated, as in canning certain kinds of fruit.

While I have described the latch or spring as double and of a peculiar form, it is obvious that it may be single, and the loops passing around the hinge-bail may be of the same size, without departing from the spirit of the invention.

It is also obvious that other forms of catches may be employed for securing the free end of the spring-wire.

Having thus described my invention, what I claim as new is—

1. In a jar-fastener, the combination, with the spring-wire hinged at one end and passing over the top of the jar, of an independent bridge-piece secured thereto and resting on said top, substantially as described.

2. In a jar-fastener, the combination, with the spring-wire passing over the top of the jar and having the coiled spring at its center, of a bridge-piece passing through said coiled spring and resting on the cover at either side, substantially as described.

3. In a jar-fastener, the combination, with the catch and ear, as described, of the spring-wire hinged to the ear by two loops passing over the cover and engaging the catch at its free end, one of the loops of the spring-wire uniting it to the ear being larger than the other, whereby the wire is permitted a slight horizontal movement, substantially as described.

4. In a jar-fastener, the combination, with the spring-wire passing over the top of the jar and having the coiled spring at the center, of a bridge-piece passing through said coiled spring and having depending loops for engaging the top of the jar, substantially as described.

5. In a jar-fastener, the combination, with the catch and ear, as described, of the spring-wire doubled and engaging said catch at the forward side, passing thence to the bridge-piece, and formed into the coiled spring circling outward on either side, the ends passing back in substantially parallel lines from the ends of the spring to and engaging with the ear, substantially as described.

THOMAS B. HOWE.

Witnesses:
S. B. COSTON,
E. C. HARDING.